(12) United States Patent
Bethouart et al.

(10) Patent No.: US 11,970,623 B2
(45) Date of Patent: Apr. 30, 2024

(54) DRY ERASE INK WITH IMPROVED DRYING TIME

(71) Applicant: SOCIÉTÉ BIC, Clichy (FR)

(72) Inventors: Carine Bethouart, Neufchatel-Hardelot (FR); Philippe Lefebvre, Wimereux (FR); Christelle Debrauwer, Saint Germain sur Morin (FR)

(73) Assignee: SOCIÉTÉ BIC, Clichy (FR)

( * ) Notice: Subject to any disclaimer, the term of this patent is extended or adjusted under 35 U.S.C. 154(b) by 1047 days.

(21) Appl. No.: 16/606,131

(22) PCT Filed: Apr. 16, 2018

(86) PCT No.: PCT/FR2018/050952
§ 371 (c)(1),
(2) Date: Oct. 17, 2019

(87) PCT Pub. No.: WO2018/193196
PCT Pub. Date: Oct. 25, 2018

(65) Prior Publication Data
US 2020/0048483 A1    Feb. 13, 2020

(30) Foreign Application Priority Data

Apr. 18, 2017  (FR) ..................................... 1753339

(51) Int. Cl.
*C09D 11/17*      (2014.01)
*B43K 8/02*       (2006.01)
*C09D 11/00*      (2014.01)

(52) U.S. Cl.
CPC .............. *C09D 11/17* (2013.01); *B43K 8/022* (2013.01)

(58) Field of Classification Search
CPC ... C09D 1/00; C09D 4/00; C09D 5/00; C09D 11/00; C09D 11/17; B43K 8/022
USPC ........................ 106/31.01, 31.13, 31.6, 31.64
See application file for complete search history.

(56) References Cited

U.S. PATENT DOCUMENTS

2010/0063186 A1    3/2010  Onyenemezu

FOREIGN PATENT DOCUMENTS

| DE | 3044036 | | 5/1982 | |
| DE | 4327366 C1 | * | 1/1995 | ............. D21H 19/54 |
| EP | 0551913 | | 7/1993 | |
| FR | 2212408 | | 7/1974 | |
| JP | H0428777 | | 1/1992 | |
| JP | H0428777 A | * | 1/1992 | |
| JP | H06 9917 A | * | 1/1994 | |
| JP | H069917 | | 1/1994 | |
| JP | H069917 A | * | 1/1994 | |
| JP | 2010-209169 | | 9/2010 | |

OTHER PUBLICATIONS

International Search Report dated Jun. 15, 2018, in International Application No. PCT/FR2018/050952 (5 pages).
International Search Report dated Jun. 6, 2018, in International Application No. PCT/FR2018/050953 (5 pages).

* cited by examiner

*Primary Examiner* — James E McDonough
(74) *Attorney, Agent, or Firm* — Bookoff McAndrews, PLLC

(57) ABSTRACT

A dry erase ink for a writing instrument. The dry erase ink includes, as the main organic solvent, a solvent selected from the group consisting of n-propyl acetate, isopropyl acetate, or mixtures thereof.

20 Claims, No Drawings

DRY ERASE INK WITH IMPROVED DRYING TIME

CROSS REFERENCE TO RELATED APPLICATIONS

This application is a National Stage application of International Application No. PCT/FR2018/050952, filed on Apr. 16, 2018, now published as WO/2018/193196 and which claims priority to French Application No. 1753339, filed Apr. 18, 2017.

FIELD

The present disclosure relates to dry-erase inks based on alkyl acetate for a writing instrument.

DESCRIPTION OF RELATED ART

Dry-erase inks are intended to be used on impermeable, i.e., non-porous, surfaces such as Velleda®-type whiteboards, for example. In the majority of cases, these are pigmented and low-viscosity inks (between 5 and 10 cP at 20° C.) for use particularly in markers with fibrous tips. They need to dry quickly, because they are can be erased by friction after drying using a dry cloth or a brush, for example.

One of the important properties of this type of ink is therefore their fast drying characteristic, which enables the user to erase a whiteboard quickly after use (without leaving any traces), regardless of the surface material of the whiteboards: polypropylene, PVC, lacquered, enameled, or melamine, for example, and even when the ink is still wet in cases in which the user has made a mistake that he wishes to correct immediately.

Dry-erase inks based on alkyl acetate are commercially available, for example under the names: BC VELLEDA®, BIC Great Erase BOLD®, and BIC Marking® by BIC. In general, the alkyl acetate that is used is n-butyl acetate, particularly in a mixture with methyl iso-butyl ketone in order to improve the drying time.

However, the present applicants have surprisingly found that the use of propyl acetate (such as n-propyl acetate or isopropyl acetate, or mixtures thereof) as the main solvent makes it possible to improve the fast-drying characteristic of the dry-erase ink without the need to resort to methyl isobutyl ketone and its short-term erasing properties (that is, even when still wet). In particular, such an ink can contain a pentaerythritol ester as a separating agent.

The application FR 2212408 discloses an ink composition for writing on boards comprising a resin, a pigment, a volatile organic solvent, and a non-volatile organic liquid. Among the many volatile organic solvents indicated in this application, esters such as ethyl acetate, propyl acetate, isopropyl acetate, butyl acetate, and isobutyl acetate are cited.

However, none of the examples uses propyl and isopropyl acetates as the solvent. Only butyl acetate is used in some examples, and never as a single solvent.

JP patent application 2010-209169 teaches that the property of the long-term erasure of a dry-erase ink can be improved by adding a neopentyl polyol ester and fatty acid, the fatty acid being $C_{4-20}$, such as tetra fatty acid pentaerythritol esters, for example, in organic solvent-based dry-erase ink compositions.

However, this document recommends the use of a lower aliphatic alcohol or a glycol ether as the main solvent. Alkyl acetates are cited among other solvents, but only as a co-solvent and without exemplification.

Patent application JP H069917 also discloses an organic solvent-based dry-erase ink. The list of suitable solvents does include n-propyl acetate and isopropyl acetate. However, no particular example in this document uses any of these solvents. The list of suitable solvents also includes n-butyl acetate (paragraph [0006]). However, as will be demonstrated in the present application, thanks to the comparative examples (example 1 and comparative example 2), n-propyl acetate makes it possible to obtain an ink that exhibits better short-term erasure results when the ink is still wet for the majority of surfaces and a shorter drying time compared to an ink containing n-butyl acetate.

The application DE 30 44 036 discloses ink compositions comprising propyl acetate as the main organic solvent. However, these are not dry-erase inks. What is more, these inks do not contain a pigment, a resin, and a separating agent.

Thus, none of the prior art documents describes or suggests that the use of propyl acetate may have the properties discovered herein according to the present disclosure (improved drying speed, improved short-term erasability characteristics when the ink is still wet).

DETAILED DESCRIPTION

The present disclosure, thus, relates to a dry-erase ink for a writing instrument comprising, as main organic solvent, a solvent that is selected from among n-propyl acetate, isopropyl acetate, or mixtures thereof, with n-propyl acetate being preferred.

For the purposes of the present disclosure, the term "dry-erase ink" refers to an ink that can be dry-erased from the substrate even after drying by simple friction without the use of water or another solvent, for example by using a dry cloth.

For the purposes of the present disclosure, the term "main solvent" refers to the solvent that is present in the greatest quantity in the ink composition according to the disclosure.

Advantageously, the "main solvent" is the only solvent in the ink, meaning that the ink does not include other solvents or co-solvents.

The main organic solvent content of the ink according to the disclosure is between 40 and 90%, in some examples between 50 and 87%, in more examples between 60 and 85%, or between 70 and 83%, and in other examples between 75 and 80% by weight relative to the total weight of the ink.

The dry-erase ink according to the present disclosure further comprises a pigment, a release agent, a resin, and optionally additives.

The pigment makes it possible to add color to the ink and is selected from among pigments that are well known to those skilled in the art, such as pigment BLUE 15:6 and/or pigment VIOLET 37, for example, which make it possible to obtain the color blue.

The pigment content of the ink according to the disclosure is between 0.5 and 10%, in some examples between 0.7 and 5%, or between 1 and 4%, and in other examples between 2 and 3% by weight relative to the total weight of the ink.

The resin that is present in the ink according to the disclosure makes it possible to provide the appropriate viscosity for writing on and adhesion to the impermeable writing surface. The resin also creates a film with the pigment after evaporation of the solvent.

The resin can be soluble in the main organic solvent. It can be natural or synthetic. The resin can be a vinyl resin, an acrylic resin, a styrene-acrylic resin, a styrene-maleic acid copolymer resin, a rosin-maleic acid copolymer resin, a phenol resin, a cellulosic resin, a ketone resin, or a mixture thereof. The resin is a vinyl resin such as a vinyl chloride copolymer, polyvinyl butyral, polyvinyl pyrrolidone, polyvinyl acetate, vinyl-pyrrolidone copolymer and vinyl acetate, or a mixture thereof. In particular, the resin is a copolymer of vinyl chloride, particularly with vinyl acetate, for example having proportions by weight of vinyl chloride of about 85% and of vinyl acetate of about 15%, and is particularly available under the name VINNOL® by WACKER, such as VINNOL® H 15/50, or VINNOL® E 15/45, or a mixture thereof.

In one particular embodiment, the resin content of the ink according to the disclosure is between 0.5 and 15%, in some examples between 1 and 10%, or between 2 and 7%, and in other examples between 4 and 5% by weight relative to the total weight of the ink.

The separating agent must be soluble in the organic solvent but solubilize the resin either little or not at all in order to allow the separation between the dry ink and the non-porous or impermeable surface, which facilitates the erasing of the ink from this surface by simple friction.

Many separating agents that are known in the prior art can be used in the context of the present disclosure, such as carboxylic acid esters, phthalic acid diesters, glycols such as butyl glycol, triethylene glycol, or the like, hexylene glycol, glycerin, aliphatic alcohols having at least 4 carbon atoms such as methoxy butanol, aliphatic hydrocarbons having more than 6 carbon atoms such as liquid paraffin, monoalkyl polyoxypropylene ethers, monoalkyl polyoxypropylene ethers polyoxyethylene, or a mixture of these compounds. The separating agent is a carboxylic acid ester, particularly selected from among fatty acid esters having at least 4 carbon atoms, alkyl carboxylic acid esters, carboxylic acid monobasic esters, diesters of dibasic acid such as diethylhexyl adipate or diisodecyl adipate, polyhydric alcohol mono- or polyesters, fatty acid triglycerides such as $C_8$-$C_{10}$ triglycerides, or pentaerythritol esters. The separating agent is selected from among alkyl carboxylic acid esters, pentaerythritol esters, and mixtures thereof.

The pentaerythritol ester can be a pentaerythritol ester of a tetra fatty acid, particularly of a $C_4$-$C_{20}$ fatty tetra fatty acid. Advantageously, it is an ester of the following general formula (I)

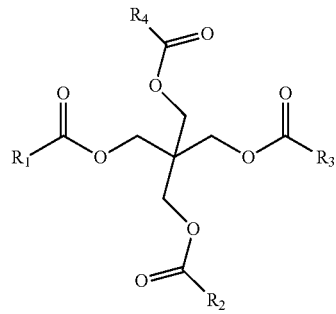

(I)

in which $R_1$, $R_2$, $R_3$, and $R_4$, independently of one another, represent a $C_4$-$C_{20}$ alkyl group, a $C_6$-$C_{12}$ alkyl group, or a $C_8$-$C_{10}$ alkyl group.

For the purposes of the present disclosure, the expression "$C_4$-$C_{20}$ alkyl group" refers to any linear or branched saturated alkyl group comprising between 4 and 20 carbon atoms. They include, for example, butyl, pentyl, hexyl, heptyl ethylhexyl, octyl, decyl, nonyl, undecyl, and dodecyl groups.

Some noteworthy examples of pentaerythritol esters according to the disclosure include pentaerythrityl tetraethylhexanoate, pentaerythrityl tetracaprylate/tetracaprate, pentaerythrityl tetracaprylate, pentaerythrityl tetracaprate, and mixtures thereof.

Advantageously, it is pentaerythrityl tetracaprylate/tetracaprate. These esters are commercially available particularly from the company STEARINERIE DUBOIS.

The pentaerythritol ester content of the ink according to the disclosure is between 0.5 and 30% by weight, in some examples between 1 and 25% by weight, more examples between 1.5 and 20%, or between 2 and 10%, and in other examples between 2.5 and 5% by weight relative to the total weight of the ink.

The use of a pentaerythritol ester as a separating agent in the ink according to the disclosure makes it possible to reduce the content of separating agent while maintaining good erasure properties over time.

The carboxylic acid alkyl ester can be such that the carboxylic acid is saturated or unsaturated. Advantageously, saturated has between 8 and 20 carbon atoms, in some examples between 6 and 12 carbon atoms, and in other examples between 8 and 10 carbon atoms. The the alkyl has between 2 and 20 carbon atoms, in some examples between 4 and 18 carbon atoms, in more examples between 10 and 16 carbon atoms, and in other examples between 14 and 16 carbon atoms. For example, it can be cetearyl ethylhexanoate, cetyl octanoate, isoketyl octanoate, stearyl octanoate, hexyl laurate, isostearyl laurate, butyl myristate, isopropyl palmitate, isostearyl palmitate, isopropyl isostearate, butyl isostearate, hexyl isostearate, ethyl oleate, 2-ethylhexyl stearate, or decyl oleate.

In particular, it is cetearyl ethylhexanoate. This ester is commercially available particularly from the company STEARINERIE DUBOIS.

The carboxylic acid alkyl ester content of the ink according to the disclosure is between 0.5 and 30%, in some examples between 1 and 25% by weight, or between 5 and 20%, in other examples between 7 and 14%, and even more examples between 8 and 12% by weight relative to the total weight of the ink.

The separating agent is a mixture of cetearyl ethylhexanoate and pentaerythrityl tetracaprylate/tetracaprate.

The separating agent content of the ink according to the disclosure is between 0.5 and 30%, in some examples between 1 and 25% by weight, in more examples between 5 and 20%, or between 10 and 15%, more particularly less than 15%, and even more particularly between 12 and 14% by weight relative to the total weight of the ink.

In a particular embodiment, the ink according to the disclosure does not comprise a polyoxyethylene-polyoxypropylene block copolymer.

In fact, contrary to what is specified in application EP0551913, the presence of such a copolymer is not necessary in the ink according to the disclosure in order to obtain good erasure properties.

In another embodiment, the ink according to the disclosure does not comprise a phosphoric acid ester of polyoxyethylene alkylene phenyl ether.

In fact, contrary to what is specified in application JP H0428777, the presence of this ester is not necessary in the ink according to the disclosure in order to obtain good erasure properties.

In another embodiment, the ink according to the disclosure does not comprise a glycerol and/or glycol, such as triethylene glycol.

The dry-erase ink according to the disclosure can further comprise additives such as surfactants (for example, of an anionic, cationic, or nonionic type such as laureth-3, phosphated alcohol ethoxylate, or mixtures thereof), manufacturing additives (for example, of the ester type, such as triglycerides, in particular C7, C8, and/or C10), drying retardants for the tip of the marker (for example, of the ester or paraffin type, such as sorbitan stearate) and mixtures thereof. In particular, a mixture of surfactants and drying retardants for the tip of the marker is used.

The additive content of the ink according to the disclosure is between 0.1 and 10%, in some examples between 0.5 and 5%, in other examples between 0.7 and 3%, and particularly between 1 and 2% by weight relative to the total weight of the ink.

The dry-erase ink according to the disclosure is therefore intended for a writing instrument such as a pen or a marker, for example, a marker, particularly with a fibrous tip. For example, the marker can have a chisel tip or a bevel tip.

The dry-erase ink according to the disclosure is intended for use on a non-porous surface, particularly a smooth surface such as a white writing board, for example. This writing board can have a surface of various compositions. It can be an enameled board, a lacquered board, a board covered with a polypropylene film, a board covered with a PVC film, or a board covered with melamine.

The present disclosure further relates to a writing instrument comprising a dry-erase ink.

The writing instrument is a pen or a marker, particularly a marker, more particularly with a fibrous tip.

For example, the marker can have a chisel tip or a bevel tip.

The present disclosure will be better understood on reading the following example, which is provided for informational purposes and is not limiting.

EXAMPLE 1

The drying time and the short- and long-term erasure properties (wet or dry) are tested for three different compositions of dry-erase ink: an ink composition according to the disclosure comprising n-propyl acetate as solvent (example 1); a comparative ink composition containing a mixture of n-butyl acetate and methyl iso-butyl ketone as solvent (comparative example 1), which corresponds to a commercially available ink; and a comparative ink composition containing n-butyl acetate as solvent (comparative example 2). The composition of these three blue inks is indicated in table 1 below.

TABLE 1

Composition of the inks in % by weight.

| | Example 1 | Comparative example 1 | Comparative example 2 |
|---|---|---|---|
| N-PROPYL ACETATE | 78.40 | | |
| N-BUTYL ACETATE | | 61.22 | 78.40 |
| METHYL ISO-BUTYLE CETONE | | 15.05 | |
| PIGMENT BLUE 15:6 | 2.40 | 2.49 | 2.40 |
| VINYLE CHLORIDE COPOLYMER | 4.90 | 5.26 | 4.90 |
| SORBITAN STEARATE | 1.00 | 0.70 | 1.00 |
| CETEARYL ETHYLHEXANOATE | 10.00 | | 10.00 |
| PENTAERYTHRITYL TETRACAPRYLATE/ TETRACAPRATE (PE C8/C10) | 3.00 | | 3.00 |
| 2-ETHYLHEXYL STEARATE | | 13.56 | |
| BUTYL GLYCOL | | 0.85 | |
| METHOXY BUTANOL | | 0.39 | |
| HEXYLENE GLYCOL | | 0.20 | |
| PHOSPHATED ALCOHOL ETHOXYLATE | 0.20 | | 0.20 |
| LAURETH-3 | 0.10 | | 0.10 |
| ALKYL POLYGLYCOL ETHER PHOSPHATE, ACID | | 0.28 | |
| TOTAL | 100.00 | 100.00 | 100.00 |

The description of the test used to compare the drying time of the two inks is as follows:

This test evaluates the time required to dry the dry-erase ink after deposition on a non-porous surface (whiteboard).

The test is performed in a room with air conditioning and controlled humidity: 23° C. (+/−2° C.)/50% relative humidity (+/−5%)

The test is performed on a Velleda® slate (polypropylene film).

Before starting the test, the substrate is cleaned with ethanol and allowed to dry for 5 minutes, followed by the washing and drying of hands.

The procedure is to draw (in less than one second) a line that is 25 cm long on the substrate by starting a chronometer as the line is begun. The marking is wiped with a finger perpendicular to the line after 2, 4, 6, 8, 10, . . . seconds. The test is completed when the line fades without smearing ink.

Drying time is the minimum time required for wiping to no longer smear ink.

Note that, for items with a tapered tip, the test must be performed with the flat part of the tip and the end of the tip.

The results on drying time are summarized in table 2 below.

TABLE 2

Ink drying time in seconds

| Marker type | Type of board | Comparative example 1 | Comparative example 2 | Example 1: |
|---|---|---|---|---|
| Felt with medium chisel tip - line width: 1.4 mm | Velleda ® slate (polypropylene film) | 6 | 8 | 2 |
| Felt with bevel tip - line width 3.4-5.5 mm | Velleda ® slate (polypropylene film) | 6 s (end of the tip) 10 s (flat part of tip) | 6 s (end of the tip) 12 s (flat part of tip) | 2 s (end of the tip) 4 s (flat part of tip) |

These results show that, regardless of the writing instrument used and hence regardless of the shape of the tip, the drying time is at least cut in half between the ink according to the disclosure and the ink of the prior art or the n-butyl acetate-based ink.

The description of the tests used to compare the erasability of the two inks is as follows: The tests are performed on different surfaces:

- a Velleda® slate (polypropylene film)
- a PVC film
- a whiteboard with a melamine surface bought on the European market
- a whiteboard with a melamine surface from the USA
- a whiteboard with lacquered surface (bought on the European market)
- a whiteboard with enameled surface (bought on the European market)

Erasability at T0:

This test evaluates the erasability of an ink deposit when it is still wet and when it is dry, as well as the effect of erasure on the substrate.

The test is performed in a room with air conditioning and controlled humidity: 23° C. (+/−2° C.)/50% relative humidity (+/−5%)

Before starting the tests, the different substrates are cleaned with ethanol and allowed to dry for 5 minutes, followed by the washing and drying of hands.

Three tests are performed:

Erasability of the wet line (before tissue): This test makes it possible to verify that the erasure is clean when the consumer makes a mistake, for example, and wishes to erase a marking immediately, without waiting out the drying time of the film on the substrate.

The procedure is to make a smear measuring 20×80 mm on each of the surfaces to be tested and wipe the smear immediately with 2 fingers in a circular motion until the smear disappears completely.

This step is repeated 5 times in succession as quickly as possible and by smearing exactly in the same place (without cleaning the substrate between wiping), and a score is assigned according to what remains visible on the support according to the scale indicated in table 3 below, which ranges from 0 to 10.

TABLE 3

| Observation | No trace | Slight Trace | Moderate trace | Strong trace | Very strong trace |
|---|---|---|---|---|---|
| Score | 10 | 7.5 | 5 | 2.5 | 0 |

Erasability of the wet line (after tissue):

If a trace is left behind, the substrate is wiped with absorbent paper (maximum 3 times) and a score is also assigned according to what remains visible on the substrate using the same scale as above in table 3, ranging from 0 to 10.

Erasability of the dry line: Normal consumer usage

The procedure consists in creating a smear measuring 20×80 mm on each of the surfaces to be tested and allow it to dry for 5 minutes. The smear is then wiped with absorbent paper in a back-and-forth motion until the smear disappears completely.

This is repeated 3 times in succession by smearing exactly in the same place (without cleaning the substrate between wiping), and a score is assigned according to what remains visible on the support using the same scale as above in table 3, ranging from 0 to 10.

Erasability Over Time:

This test evaluates how long it takes for a dry-erase ink deposit to adhere to a given surface and no longer be erasable. The test is performed in a room with air conditioning and controlled humidity: 23° C. (+/−2° C.)/50% relative humidity (+/−5%)

Before starting the tests, the different substrates are cleaned with ethanol and allowed to dry for 5 minutes.

The procedure consists in creating a number of smears (measuring 10×10 mm) vertically on each of the surfaces to be tested equivalent to the number of desired aging intervals. After each aging interval and for each support, the smear is wiped with clean absorbent paper in a quick and fluid back-and-forth motion without pressing too hard.

The test is stopped as soon as the ink adheres to the substrate or as soon as the ink is no longer erased at all.

In the standard procedure, this test is performed up to 3 months.

The erasure result, expressed in time, corresponds to the aging interval preceding the adhesion of the ink or the non-erasure of the ink. The results obtained with the different inks are presented in table 4 below.

TABLE 4

Results of the erasure tests

| Tests | Surface | Comparative example 1 | | | Comparative example 2 | | | Example 1 | | |
|---|---|---|---|---|---|---|---|---|---|---|
| | | Wet line before tissue | Wet line after tissue | Dry line | Wet line before tissue | Wet line after tissue | Dry line | Wet line before tissue | Wet line after tissue | Dry line |
| Erasability at T0 (score) | Velleda ® | 5 | 10 | 10 | 5 | 10 | 10 | 5 | 10 | 10 |
| | PVC film | 7.5 | 10 | 10 | 5 | 10 | 10 | 7.5 | 10 | 10 |
| | Melamine (EU) | 5 | 10 | 10 | 5 | 10 | 10 | 7.5 | 10 | 10 |
| | Melamine (USA) | 7.5 | 10 | 10 | 5 | 10 | 10 | 7.5 | 10 | 10 |
| | Lacquered | 2.5 | 10 | 10 | 0 | 10 | 10 | 7.5 | 10 | 10 |
| | Enameled | 2.5 | 10 | 10 | 0 | 10 | 10 | 5 | 10 | 10 |
| Erasability over time (in time) | Velleda ® | Between 2 and 3 months | | | Between 2 and 3 months | | | Between 2 and 3 months | | |
| | PVC film | 3 months OK | | | 3 months OK | | | 3 months OK | | |
| | Melamine (EU) | 3 months OK | | | 3 months OK | | | 3 months OK | | |
| | Melamine (USA) | 3 months OK | | | 3 months OK | | | 3 months OK | | |

TABLE 4-continued

Results of the erasure tests

| Tests | Surface | Comparative example 1 | | | Comparative example 2 | | | Example 1 | | |
|---|---|---|---|---|---|---|---|---|---|---|
| | | Wet line before tissue | Wet line after tissue | Dry line | Wet line before tissue | Wet line after tissue | Dry line | Wet line before tissue | Wet line after tissue | Dry line |
| | Lacquered | 3 months OK | | | 3 months OK | | | 3 months OK | | |
| | Enameled | 3 months OK | | | 3 months OK | | | 3 months OK | | |

The short-term erasure results with the still-wet ink are better for the majority of surfaces with the ink according to the disclosure compared to comparative tests 1 and 2.

The long-term erasure results are the same between the three inks and are good.

Although the preceding description has been detailed herein with reference to particular materials, embodiments and combinations, it is not intended to be limited to the particulars disclosed herein; rather, it extends to all functionally equivalent materials, embodiments, combinations, methods and uses, such as are within the scope of the appended claims.

The invention claimed is:

1. A dry-erase ink for a writing instrument, comprising a solvent that is selected from the group consisting of n-propyl acetate, or isopropyl acetate as the main organic solvent, wherein the solvent is between 70% and 83% by weight relative to a total weight of the ink, the ink includes a pigment, a resin, a separating agent and, additives,
   wherein the separating agent is a mixture of an alkyl carboxylic acid ester and an ester of pentaerythritol, wherein the alkyl carboxylic acid ester is between 8% and 12% by weight relative to a total weight of the ink and the ester of pentaerythritol is between 2% and 10% by weight relative to a total weight of the ink, and
   wherein the dry-erase ink is without polyoxyethylene-polyoxypropylene alkyl ether and without a polyoxyethylene alkylphenyl ether phosphate.

2. The dry-erase ink according to claim 1, wherein the main organic solvent is n-propyl acetate.

3. The dry-erase ink according to claim 1, wherein the main organic solvent is the sole solvent of the ink.

4. The dry-erase ink according to claim 1, wherein the main organic solvent content is between 75% and 80% by weight relative to a total weight of the ink.

5. The dry-erase ink according to claim 1, wherein the additive is selected from the group consisting of surfactants, drying retardants for the tip of the marker, manufacturing additives, and mixtures thereof.

6. The dry-erase ink according to claim 1, wherein the pigment content is between 0.5 and 10% by weight relative to a total weight of the ink.

7. The dry-erase ink according to claim 1, wherein the resin content is between 0.5 and 15% by weight relative to a total weight of the ink.

8. The dry-erase ink according to claim 1, wherein the additive content is between 0.1 and 10% by weight relative to a total weight of the ink.

9. A writing instrument, comprising a fibrous tip, the writing instrument includes a dry-erase ink as set forth according to claim 1.

10. A dry-erase ink for a writing instrument, comprising a solvent that is selected from the group consisting of n-propyl acetate, isopropyl acetate, and mixtures thereof as the main organic solvent, wherein the solvent is between 70% and 83% by weight relative to a total weight of the ink, the ink includes a pigment, a resin, a separating agent and, additives,
    wherein the separating agent is a mixture comprising an ester of pentaerythritol and the separating agent is between 12 and 14% by weight relative to a total weight of the ink and,
    wherein the dry-erase ink is without polyoxyethylene-polyoxypropylene alkyl ether and without a polyoxyethylene alkylphenyl ether phosphate.

11. The dry-erase ink according to claim 10, wherein the dry-erase ink is without glycerol and/or glycol.

12. The dry-erase ink according to claim 11, wherein the main organic solvent is n-propyl acetate.

13. The dry-erase ink according to claim 12, wherein the main organic solvent is the sole solvent of the ink.

14. A dry-erase ink for a writing instrument, comprising a solvent consisting of n-propyl acetate, wherein the solvent is between 75% and 80% by weight relative to a total weight of the ink, the ink includes a pigment, a resin, a separating agent and, additives,
    wherein the separating agent is an ester of pentaerythritol and is between 2.5% and 5% by weight relative to a total weight of the ink.

15. The dry-erase ink according to claim 14, wherein the pigment content is between 0.5 and 10% by weight relative to a total weight of the ink.

16. The dry-erase ink according to claim 1, wherein the ester of pentaerythritol is between 2.5% and 5% by weight relative to a total weight of the ink.

17. The dry-erase ink according to claim 1, wherein the additive is a surfactant and the surfactant is selected from the group consisting of laureth-3, phosphated alcohol ethoxylate, and mixtures thereof.

18. The dry-erase ink according to claim 1, wherein the alkyl carboxylic acid ester is cetearyl ethylhexanoate.

19. The dry-erase ink according to claim 10, wherein the mixture further comprises an alkyl carboxylic acid ester and wherein the alkyl carboxylic acid ester is cetearyl ethylhexanoate.

20. The dry-erase ink according to claim 14, wherein the dry-erase ink is without polyoxyethylene-polyoxypropylene alkyl ether and without a polyoxyethylene alkylphenyl ether phosphate.

* * * * *